United States Patent
Wu

(10) Patent No.: US 11,982,028 B1
(45) Date of Patent: May 14, 2024

(54) CAM AND CAM STRUCTURE OF CIRCULAR KNITTING MACHINE

(71) Applicant: CHANGSHU HUAKUN KNITTING CO., LTD., Jiangsu (CN)

(72) Inventor: Jian Wu, Jiangsu (CN)

(73) Assignee: CHANGSHU HUAKUN KNITTING CO., LTD., Jiangsu (CN)

( * ) Notice: Subject to any disclaimer, the term of this patent is extended or adjusted under 35 U.S.C. 154(b) by 0 days.

(21) Appl. No.: 18/386,854

(22) Filed: Nov. 3, 2023

Related U.S. Application Data

(63) Continuation of application No. PCT/CN2023/115717, filed on Aug. 30, 2023.

(30) Foreign Application Priority Data

Jul. 5, 2023 (CN) .......................... 202310817134.1

(51) Int. Cl.
*D04B 15/32* (2006.01)

(52) U.S. Cl.
CPC .................. *D04B 15/32* (2013.01)

(58) Field of Classification Search
CPC .... D04B 15/32; D04B 15/322; D04B 15/325; D04B 15/327
USPC ............................................................. 66/57
See application file for complete search history.

(56) References Cited

U.S. PATENT DOCUMENTS

| | | | | |
|---|---|---|---|---|
| 2,756,574 A | * | 7/1956 | Shortland | D04B 15/32 66/57 |
| 3,848,432 A | * | 11/1974 | Mishcon | D04B 15/32 66/57 |
| 3,869,879 A | * | 3/1975 | Brunner | D04B 15/327 66/54 |
| 4,798,064 A | * | 1/1989 | Elsasser | D04B 15/32 66/57 |
| 2015/0128651 A1 | * | 5/2015 | Lonati | D04B 15/10 66/57 |
| 2017/0350047 A1 | | 12/2017 | Lonati et al. | |

FOREIGN PATENT DOCUMENTS

| | | |
|---|---|---|
| CN | 202099527 U | 1/2012 |
| CN | 209024724 U | 6/2019 |
| CN | 113215716 A | 8/2021 |

(Continued)

OTHER PUBLICATIONS

International Search Report of Corresponding Application No. PCT/CN2023/115717, mailed Jan. 12, 2024, 5 pages.

(Continued)

*Primary Examiner* — Aiying Zhao
(74) *Attorney, Agent, or Firm* — Cooper Legal Group, LLC

(57) ABSTRACT

A cam and a cam structure of a circular knitting machine include a cam body, and the cam body is successively defined with a needle inlet groove, a needle running groove and a needle outlet groove, the needle running groove is in communication with the needle inlet groove and the needle outlet groove, a width of the needle running groove is between 3.1 mm-3.3 mm, and a knitting needle is moved in the needle running groove with a width between 3.1 mm-3.3 mm, so that increased stroke of the knitting needle due to the inertia of upward and downward movements can be reduced. The density is increased by a range of between 5 and 10 mesh per inch.

5 Claims, 4 Drawing Sheets

(56) References Cited

FOREIGN PATENT DOCUMENTS

| | | | | |
|---|---|---|---|---|
| CN | 113802259 A | * | 12/2021 | ............. D04B 15/32 |
| CN | 215628557 U | | 1/2022 | |
| CN | 216550958 U | | 5/2022 | |
| CN | 113215716 B | * | 12/2022 | ............... D04B 1/10 |
| DE | 102015222197 A1 | * | 5/2017 | ............. D04B 15/32 |
| GB | 1352892 A | | 5/1974 | |
| JP | 2005240193 A | | 9/2005 | |
| JP | 2009161874 A | | 7/2009 | |
| JP | 2010159530 A | | 7/2010 | |
| KR | 101566280 B1 | | 11/2015 | |
| TW | 435462 U | | 5/2001 | |

OTHER PUBLICATIONS

First Office Action cited in corresponding Japanese patent Application No. 2023-190347, dated Jan. 12, 2024, 8 pages.

\* cited by examiner

CAM AND CAM STRUCTURE OF CIRCULAR KNITTING MACHINE

CROSS-REFERENCE TO RELATED APPLICATION

The present application is a continuation of PCT application No. PCT/CN2023/115717, filed on Aug. 30, 2023, which is based on and claims the priority benefits of China application No. 202310817134.1, filed on Jul. 5, 2023. The entireties of PCT application No. PCT/CN2023/115717 and China application No. 202310817134.1 are hereby incorporated by reference herein and made a part of this specification.

TECHNICAL FIELD

The present application relates to the technical field of circular knitting machines, and in particular to a cam and a cam structure of a circular knitting machine.

BACKGROUND ART

A circular knitting machine is scientifically referred to as a circular weft knitting machine (or simply, circular knitting machine). Since the circular knitting machine has the advantages of multiple knitting systems (often referred to as "yarn feeding courses" or "loop forming courses" in the industry, simply referred to as "courses"), high rotation speed, high production output, rapid pattern changes, excellent fabric quality, fewer procedures, and high product adaptability, it gains a rapid development. The circular knitting machine is composed of a frame, a knitting mechanism, a yarn feeding mechanism, a transmission mechanism, a lubrication and dust removal mechanism, an electrical control mechanism, a tensioning and winding mechanism and other auxiliary devices. Among them, the knitting mechanism is a heart of the circular knitting machine, and is mainly composed of a needle cylinder, a knitting needle, a cam, a cam support (a carriage), and a sinker (only present in a single-sided machine). The cam is also called a "mount cap" or a rhombus corner, configured to control the reciprocating motion of the knitting needle and the sinker in the needle cylinder groove according to the different needs of knitted products on the circular knitting machine. The cam has five types: a stitch cam, a tuck cam, a float stitch cam, an anti-stringing cam, and a needle-inserting cam.

At present, a cam comprises a cam body, a needle inlet groove, a needle running groove and a needle outlet groove are successively defined in the cam body along a moving direction of a knitting needle, and the needle running groove includes an ascending groove, a descending groove, a yarn catching groove and a looping groove successively defined in the cam body; the needle inlet groove is in communication with the ascending groove and a first circular arc is formed at a joint therebetween, a second circular arc is formed at a joint between the ascending groove and the descending groove, and the looping groove is in communication with the needle outlet groove and a third circular arc is formed at a joint therebetween; the width of each of the ascending groove, the descending groove, the yarn catching groove and the looping groove is 6.5 mm, that is, the width of the needle running groove is 6.5 mm. The knitting needle enters the ascending groove from the needle inlet groove, then passes through the descending groove, then enters the yarn catching groove, then enters the looping groove, and finally moves out of the cam body from the needle outlet groove.

In the process of implementing present application, it has been found that there are at least the following problems present in the above related art: since the width of the needle running groove is relatively large, when the knitting needle is moved in the needle running groove, the inertia of upward and downward movements of the knitting needle have to have an increased stroke, resulting in decreased density of the knitted loop.

SUMMARY

In order to increase a density of knitted loops, the present application provides a cam and a cam structure of a circular knitting machine.

In a first aspect, the present application provides a cam, adopting the following technical solution:

a cam including a cam body, wherein the cam body is successively defined with a needle inlet groove, a needle running groove and a needle outlet groove, the needle running groove is in communication with the needle inlet groove and the needle outlet groove, and the width of the needle running groove is between 3.1 mm-3.3 mm.

By adopting the above-mentioned technical solution, the knitting needle enters the needle running groove from the needle inlet groove, then moves to the needle outlet groove from the needle running groove, and finally moves out of the cam body from the needle outlet groove, the knitting needle will knit the yarn into a loop when moving in the needle running groove. The movement of the knitting needle in the needle running groove having a width of between 3.1 mm-3.3 mm makes it possible to reduce the stroke of the knitting needle increased due to the inertia of upward and downward movement, thereby increasing the density of the knitted loops by a range of between 5 and 10 meshes per inch.

Optionally, the needle running groove includes an ascending groove, a descending groove, a yarn catching groove and a looping groove successively provided on the cam body, an end of the ascending groove away from the descending groove is in communication with the needle inlet groove, and a first circular arc is formed at a joint between the needle inlet groove and the ascending groove; a second circular arc is formed at a joint between the ascending groove and the descending groove; the yarn catching groove has a circular arc shape in cross section; an end of the looping groove away from the yarn catching groove is in communication with the needle outlet groove, and a third circular arc is formed at a joint between the looping groove and the needle outlet groove.

By adopting the above-mentioned technical solution, the knitting needle enters the ascending groove from the needle inlet groove, then passes through the descending groove, then enters the yarn catching groove, then enters the looping groove, and finally moves out of the cam body from the needle outlet groove; the first circular arc, the second circular arc and the third circular arc are formed so as to enable smooth transition of the knitting needles while the knitting needles are moving, thereby reducing damage to the knitting needles.

Optionally, an included angle between the descending groove and the ascending groove is between 59 degrees and 61 degrees.

By adopting the above-mentioned technical solution, the included angle between the ascending groove and the descending groove can protect the knitting needle by a smooth transition of the knitting needle, so as to facilitate the subsequent knitting needle to better knit the yarn into a loop.

Optionally, two guide blocks are provided on the cam body, and the two guide blocks form a guide hole in communication with the needle outlet groove.

By using the above-mentioned technical solution, the guide hole formed by the two guide blocks can facilitate moving the knitting needle from the needle outlet groove of the cam to the needle inlet groove of the adjacent cam.

Optionally, the cam body includes a first half body, a second half body, a connecting body and a first connecting bolt, the first half body is connected to the connecting body by the first connecting bolt, and the second half body is also connected to the connecting body by the first connecting bolt; and the first half body and the second half body form the needle inlet groove, the needle running groove and the needle outlet groove on the connecting body.

In the above-mentioned technical solution, when the first half body or the second half body is damaged, the needle running groove formed in the connecting body of the first half body and the second half body is deformed, resulting in a change in the movement path of the knitting needle, which causes a problem in the knitted loop; therefore, when the first half body or the second half body is damaged, the first connecting bolt is rotated to separate the first connecting bolt from the connecting body, and then the damaged first half body or the second half body is replaced, so as to ensure the quality of the knitted loop. Further, since only the damaged part is replaced, resource saving can be achieved.

Optionally, the connecting body includes a third half body, a fourth half body and a second connecting bolt, a first threaded hole is defined in the third half body, a second threaded hole is defined in the fourth half body, the second connecting bolt passes through the second threaded hole on the fourth half body and is in threaded connection with the first threaded hole on the third half body, and the second threaded hole is also in threaded connection with the second connecting bolt; and the first half body is connected to the third half body by the first connecting bolt and the second half body is connected to the fourth half body by the first connecting bolt.

By using the above-mentioned technical solution, the first half body is connected to the third half body by the first connecting bolt, and the second half body is connected to the fourth half body by the first connecting bolt; when the width of the needle running groove formed by the first half body located on the third half body and the second half body located on the fourth half body is not between 3.1 mm-3.3 mm, a distance between the third half body and the fourth half body can be adjusted according to need so that the width of the needle running groove is between 3.1 mm-3.3 mm; after the position of the third half body relative to the fourth half body is determined, the second connecting bolt is threadedly connected to the first threaded hole on the third half body through the second threaded hole on the fourth half body, and the second threaded hole on the fourth half body is also threadedly connected to the second connecting bolt, so as to realize a connection between the third half body and the fourth half body. The providing of an adjustable connecting body therefore also ensures proper use of the cam.

In a second aspect, the present application provides a cam structure for a circular knitting machine, adopting the following technical solution:

a cam structure of a circular knitting machine, including a carriage body, a plurality of groups of connecting assemblies and adjusting assemblies, the connecting assemblies include two adjusting blocks and a plurality of third connecting bolts, both of the adjusting blocks are slidably arranged on the carriage body, the third half body is connected to one of the adjusting blocks by one of the third connecting bolts, and the fourth half body is connected to the other of the adjusting blocks by one of the third connecting bolts; the adjusting assembly is provided on the carriage body, and the adjusting blocks in the plurality of groups of the connecting assemblies are connected to the adjusting assembly.

By using the above-mentioned technical solution, the third half body and the fourth half body which are connected together by the second connecting bolt are firstly connected to the two adjusting blocks by the third connecting bolt respectively. When the distance between the third half body and the fourth half body needs to be adjusted, namely, when the width of the needle running groove needs to be adjusted, the second connecting bolt is first separated from the second threaded hole on the fourth half body, then the positions of the two adjusting blocks in the connecting assembly are adjusted by the adjusting assembly, thereby changing the positions of the third half body and the fourth half body, and, after the positions of the third half body and the fourth half body are determined, the second connecting bolt is threadedly connected with the second threaded hole on the fourth half body. In addition, when it is necessary to mount the carriage on the circular knitting machine, the distance between the third half body and the fourth half body can be increased firstly, so that neither the first half body nor the second half body abut against the knitting needle, and then the position of the third half body and the fourth half body can be adjusted by the adjusting assembly, so that the width of the needle running groove formed between the first half body and the second half body can be reduced, thereby better positioning the knitting needle in the needle running groove, quickly matching the knitting needle with the needle running groove located on the cam of the carriage body, and reducing the adjustment time and improving efficiency.

Optionally, the adjusting assembly includes an adjustment shaft and a bidirectional screw, wherein the adjustment shaft is rotatably arranged on the carriage body, the bidirectional screw is provided with a plurality of bidirectional screw, a plurality of bidirectional screw are all arranged on the adjustment shaft, the bidirectional screws are in one-to-one correspondence with the connection assemblies, the bidirectional screw passes through two of the adjusting blocks, and two of the adjusting blocks in a same group of the connecting assembly are respectively in threaded connection with two ends of a same bidirectional screw.

By using the above-mentioned technical solution, the adjustment shaft is rotated, and the adjustment shaft drives the bidirectional screw to rotate, and the bidirectional screw will drive the two adjusting blocks to move toward or away from each other. The adjusting assembly as provided is simple in structure and easy to operate.

In summary, the present application can achieve at least one of the following beneficial technical effects.
1. The knitting needle is moved in a needle running groove with a width of between 3.1 mm-3.3 mm, so as to reduce the stroke of the knitting needle increased due to the inertia of upward and downward movements, thereby increasing the density of the knitted loops by a range between 5 meshes and 10 meshes per inch; and
2. The providing of the cam structure enables the knitting needles to be quickly engaged with the needle running groove on the cam of the carriage body, reducing the adjustment time and improving the efficiency.

DETAILED DESCRIPTION

The present application is described in further detail below with reference to FIGS. 1-4.

Embodiments of the present application disclose a cam and a cam structure of a circular knitting machine.

Figure 1:
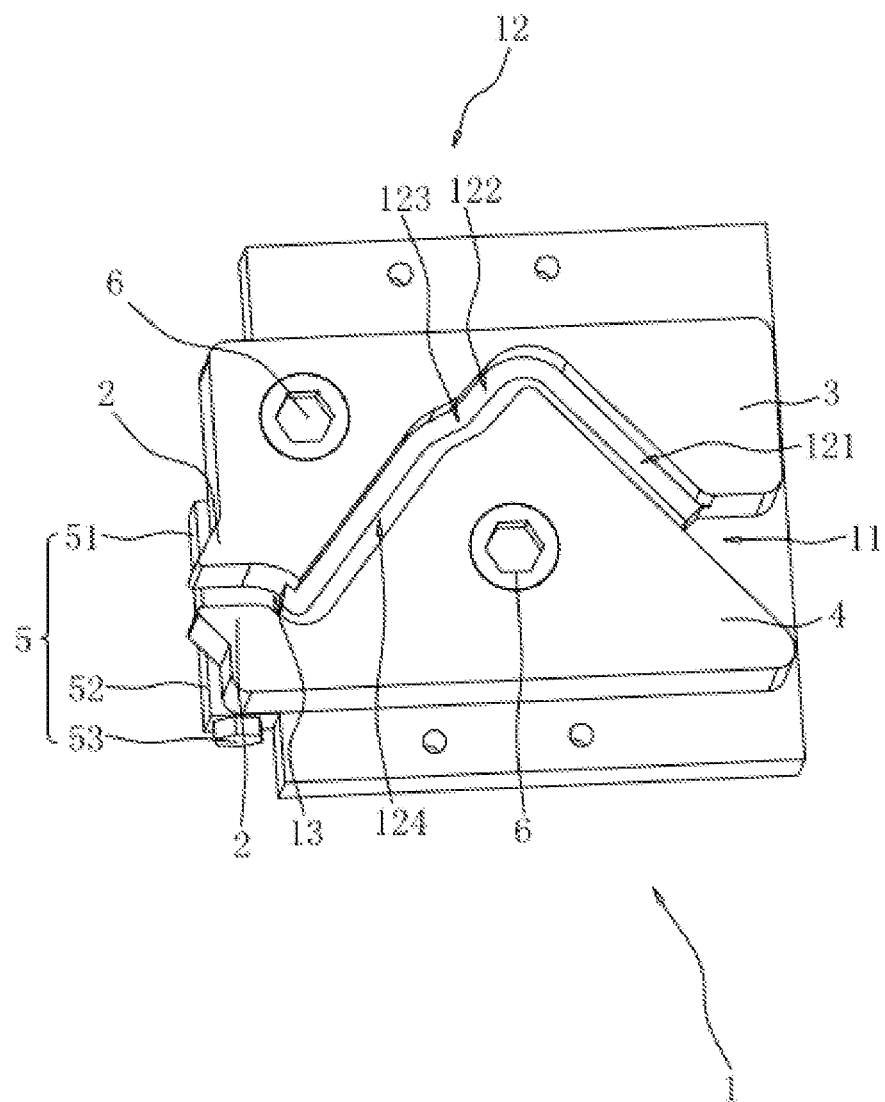
FIG. 1 is a schematic diagram showing the structure of a cam in an embodiment of the present application.

With reference to FIG. 1, a cam includes a cam body 1, the cam body 1 includes a connecting body 5, a first half body 3 is arranged on one end of the connecting body 5, and a second half body 4 is arranged on the other end of the connecting body 5.

Figure 2:
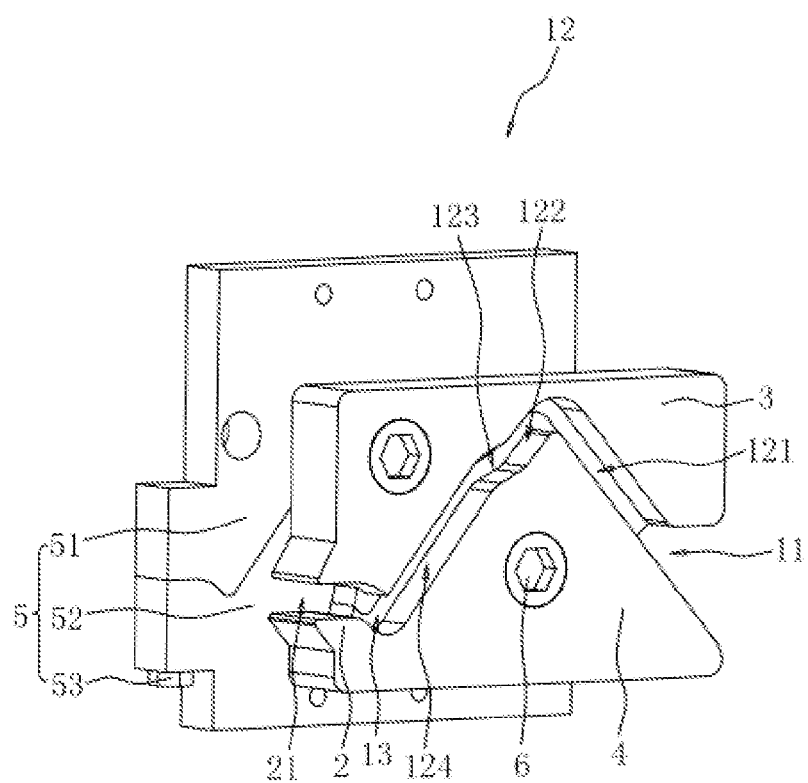
FIG. 2 is a schematic structural diagram of a connecting body in an embodiment of the present application.

With reference to FIG. 2, the connecting body 5 includes a third half body 51, and a first threaded hole is defined in the third half body 51. A fourth half body 52 is provided on one side of the third half body 51, and a second threaded hole is defined in the fourth half body 52. The fourth half body 52 is provided with a second connecting bolt 53 threadedly connected to the first threaded hole of the third half body 51 through a second threaded hole of the fourth half body 52, and the second connecting bolt 53 is also threadedly connected to the second threaded hole of the fourth half body 52.

The first half body 3 abuts against the third half body 51, and the first half body 3 is provided with a first connecting bolt 6 which passes through the first half body 3 and is in a threaded connection with the third half body 51; the second half body 4 abuts against the fourth half body 52, and the second half body 4 is provided with a first connecting bolt 6 which passes through the second half body 4 and is in a threaded connection with the fourth half body 52.

With reference to FIG. 1, a needle inlet groove 11, a needle running groove 12, and a needle outlet groove 13 are successively defined between the first half body 3 connected to the third half body 51 and the second half body 4 connected to the fourth half body 52 in a moving direction of the knitting needles. The needle running groove 12 includes an ascending groove 121, a descending groove 122, a yarn catching groove 123, and a looping groove 124 successively in the moving direction of the knitting needles. An end of the ascending groove 121 is in communication with the needle inlet groove 11, and a first circular arc is formed at a joint between the needle inlet groove 11 and the ascending groove 121; an end of the ascending groove 121 away from the needle inlet groove 11 is in communication with the descending groove 122, and a second circular arc is formed at a joint between the ascending groove 121 and the descending groove 122, and an included angle between the ascending groove 121 and the descending groove 122 is between 59 degrees and 61 degrees, preferably being 60 degrees in the present embodiment; an end of the descending groove 122 away from the ascending groove 121 is in communication with the yarn catching groove 123, and the yarn catching groove 123 has a circular arc shape in cross section; an end of the yarn catching groove 123 away from the descending groove 122 is in communication with the looping groove 124; an end of the looping groove 124 away from the yarn catching groove 123 is in communication with the needle outlet groove 13, and a third circular arc is formed at a joint between the looping groove 124 and the needle outlet groove 13.

The width of the needle running groove 12 is between 3.1 mm-3.3 mm, preferably 3.25 mm in the present embodiment, i.e. the widths of the ascending groove 121, the descending groove 122, the yarn catching groove 123 and the looping groove 124 are all 3.25 mm.

With reference to FIG. 2, a guide block 2 is fixedly connected to one end of the first half body 3 close to the needle outlet groove 13 and to one end of the second half body 4 close to the needle outlet groove 13, the guide block 2 on the first half body 3 and the guide block 2 on the second half body 4 together form a guide hole 21, and the guide hole 21 is in communication with the needle outlet groove 13.

The knitting needle is moved from the needle inlet groove 11 into the ascending groove 121, then passes through the descending groove 122, then into the yarn catching groove 123, then into the looping groove 124, then from the needle outlet groove 13 into the guide hole 21, and finally out of the cam body 1 from the guide hole 21.

The implementation principle of a cam in the embodiments of the present application is: the first half body 3 is connected to the third half body 51 by a first connecting bolt 6 and the second half body 4 is connected to the fourth half body 52 by a first connecting bolt 6.

Then, the positions of the third half body 51 and the fourth half body 52 are adjusted so that the width of the needle running groove 12 formed by the first half body 3 and the second half body 4 is 3.25 mm. Finally, the second connecting bolt 53 is threadedly connected to the first threaded hole of the third half body 51 through the second threaded hole of the fourth half body 52, and the second connecting bolt 53 is also threadedly connected to the second threaded hole of the fourth half body 52.

The embodiments of the present application also disclose a cam structure of a circular knitting machine.

Figure 3:
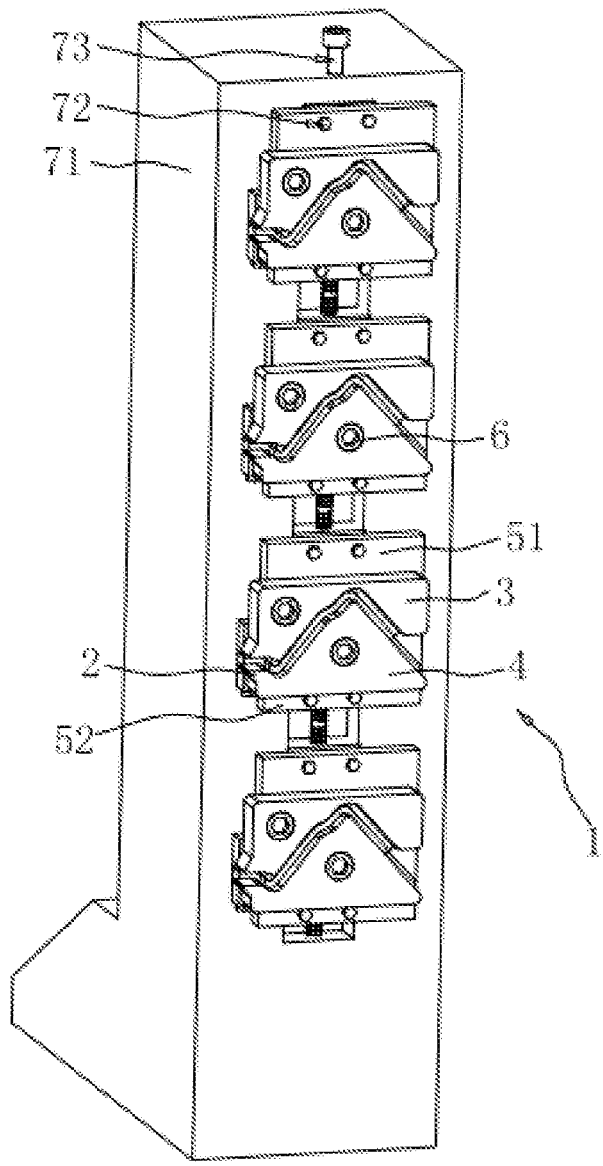
FIG. 3 is a schematic diagram of a cam structure of a circular knitting machine in an embodiment of the present application.
Figure 4:
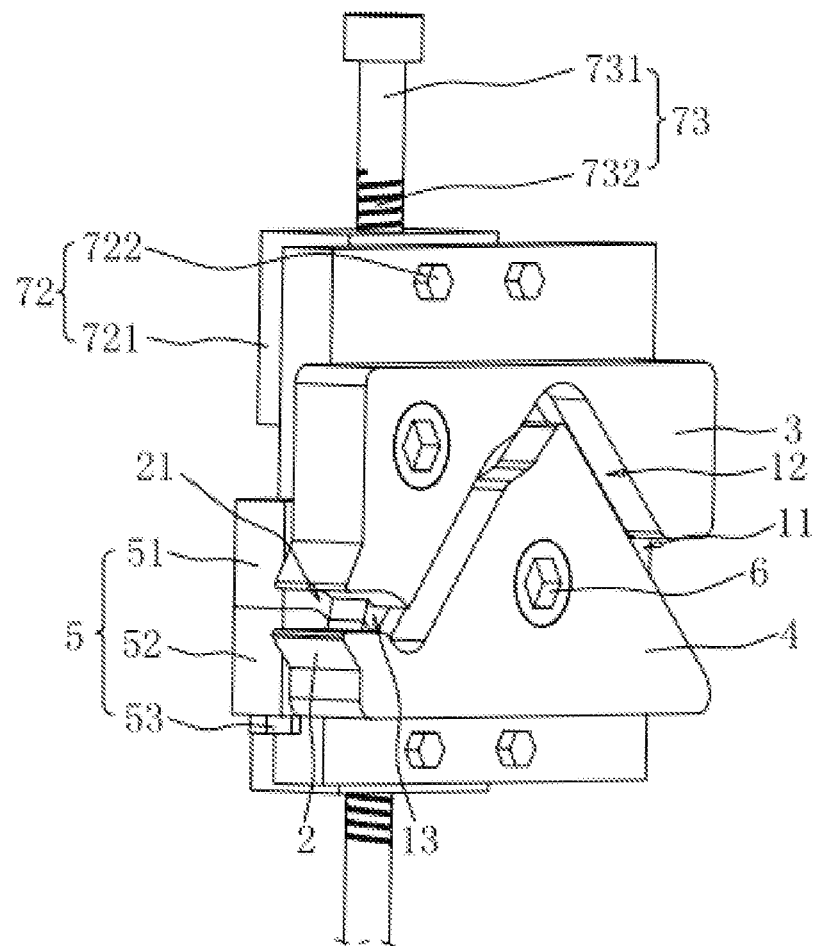
FIG. 4 is a schematic structural diagram of an adjusting assembly in an embodiment of the present application.

With reference to FIGS. 3 and 4, a cam structure of a circular knitting machine includes a carriage body 71, a sliding groove is provided on the carriage body 71; the carriage body 71 is provided with four groups of connecting assemblies 72, each group of the connecting assemblies 72 is connected to one cam body 1, and each group of the connecting assemblies 72 includes two adjusting blocks 721 slidably connected in a sliding groove; the third half body 51 in the cam body 1 abuts against one of the adjusting blocks 721, and the third half body 51 is provided with a third connecting bolt 722 which passes through the third half body 51 and is in a threaded connection with the adjusting block 721; the fourth half body 52 of the cam body 1 abuts against another adjusting block 721, and the fourth half body 52 is also provided with a third connecting bolt 722 which passes through the fourth half body 52 and is in a threaded connection with the adjusting block 721.

With reference to FIGS. 3 and 4, the carriage body 71 is provided with an adjusting assembly 73, the adjusting assembly 73 includes an adjustment shaft 731 rotating in the sliding groove, the adjustment shaft 731 is provided with four bidirectional screws 732, and the four bidirectional screws 732 are in one-to-one correspondence with four groups of the connecting assemblies 72; and two adjusting blocks 721 in each group of the connection assemblies 72 are respectively threadedly connected to two ends of the bidirectional screw 732.

The implementation principle of a cam structure of a circular knitting machine according to an embodiment of the present application is: firstly, the third half body 51 and the fourth half body 52 which are connected together by the second connecting bolt 53 are respectively connected to two adjusting blocks 721 of the same group of the connecting assemblies 72 by a third connecting bolt 722. When the distance between the third half body 51 and the fourth half body 52 needs to be adjusted, namely, the width of the needle running groove 12 needs to be adjusted, the second connecting bolt 53 is firstly separated from the first threaded hole on the third half body 51, and then the adjustment shaft 731 is rotated; the adjustment shaft 731 drives the bidirectional screw 732 to rotate; the bidirectional screw 732 will drive the two adjusting blocks 721 to move towards or away from each other; and the distance between the third half body 51 and the fourth half body 52 on the two adjusting blocks 721 will change. After the positions of the third half body 51 and the fourth half body 52 are fixed, the second connecting bolt 53 is threadedly connected to the first threaded hole of the third half body 51.

The above are all preferred embodiments of the present application, and do not limit the scope of protection of the present application according thereto; therefore: all changes that come within the meaning and range of equivalency of the claims are to be embraced within their scope.

LISTING OF REFERENCE SIGNS

1. Cam body
11. Needle inlet groove
12. Needle running groove
121. Ascending groove
122. Descending groove
123. Yarn catching groove
124. Looping groove
13. Needle outlet groove
2. Guide block
21. Guide hole
3. First half body
4. Second half body
5. Connecting body
51. Third half body
52. Fourth half body
53. Second connecting bolt
6. First connecting bolt
71. Carriage body
72. Connecting assembly
721. Adjustment block
722. Connecting bolt
73. Adjusting assembly
731. Adjusting shaft
732. Bidirectional screw.

What is claimed is:

1. A cam structure of a circular knitting machine comprising a cam for the circular knitting machine configured to engage with knitting needles, a carriage body, a plurality of groups of connecting assemblies and an adjusting assembly,
wherein the cam comprises a cam body, the cam body is successively defined with a needle inlet groove, a needle running groove and a needle outlet groove, the needle running groove is in communication with the needle inlet groove and the needle outlet groove, and a width of the needle running groove is between 3.1 mm and 3.3 mm;
wherein the cam body comprises a first half body, a second half body, a connecting body and first connecting bolts, the first half body and the second half body are connected to the connecting body by the first connecting bolts, and the first half body and the second half body form the needle inlet groove, the needle running groove and the needle outlet groove on the connecting body;
wherein the connecting body comprises a third half body, a fourth half body and a second connecting bolt, a first threaded hole is defined in the third half body, a second threaded hole is defined in the fourth half body, the second connecting bolt passes through the second threaded hole in the fourth half body and is in threaded connection with the first threaded hole in the third half body, the second threaded hole is in threaded connection with the second connecting bolt, and the first half body is connected to the third half body by the first connecting bolts and the second half body is connected to the fourth half body by the first connecting bolts;
wherein each connecting assembly in the plurality of groups of connecting assemblies comprises two adjusting blocks and a plurality of third connecting bolts, both of the two adjusting blocks are slidably arranged on the carriage body, the third half body is connected to one of the two adjusting blocks by one of the plurality of third connecting bolts, and the fourth half body is connected to a second one of the two adjusting blocks by a second one of the plurality of third connecting bolts; and
wherein the adjusting assembly is provided on the carriage body, and the two adjusting blocks in the plurality of groups of connecting assemblies are connected to the adjusting assembly.

2. The cam structure of a circular knitting machine according to claim 1, wherein the needle running groove comprises an ascending groove, a descending groove, a groove following the descending groove, and a groove before the needle outlet groove sequentially defined in the cam body,
an end of the ascending groove departing from the descending groove is in communication with the needle inlet groove, and a first circular arc is formed at a joint between the needle inlet groove and the ascending groove;
a second circular arc is formed at a joint between the ascending groove and the descending groove;
the groove following the descending groove has a circular arc shape in a cross section; and
an end of the groove before the needle outlet groove departing from the groove following the descending groove is in communication with the needle outlet groove, and a third circular arc is formed at a joint between the groove before the needle outlet groove and the needle outlet groove.

3. The cam structure of a circular knitting machine according to claim 2, wherein an included angle between the descending groove and the ascending groove is between 59 degrees and 61 degrees.

4. The cam structure of a circular knitting machine according to claim 1, wherein two guide blocks are provided on the cam body, and the two guide blocks form a guide hole in communication with the needle outlet groove.

5. The cam structure of a circular knitting machine according to claim 1, wherein the adjusting assembly comprises an adjustment shaft and a plurality of bidirectional screws,
wherein the adjustment shaft is rotatably arranged on the carriage body, each of the plurality of bidirectional screws is arranged on the adjustment shaft, the plurality of bidirectional screws are in one-to-one correspondence with connecting assemblies of the plurality of groups of connecting assemblies, each of the plurality of bidirectional screws passes through the two adjusting blocks of a corresponding one of the connecting assemblies, and the two adjusting blocks in a same group of the plurality of groups of connecting assemblies are respectively threadedly connected with two ends of a same bidirectional screw of the plurality of bidirectional screws.

* * * * *